United States Patent
Starkey et al.

(10) Patent No.: US 8,241,031 B2
(45) Date of Patent: Aug. 14, 2012

(54) DEMOLDING DEVICE FOR AN INJECTION MOLDING PART WITH AN UNDERCUT

(75) Inventors: Glenn Starkey, Wauconda, IL (US); John N. Wakefield, Buckinghamshire (GB)

(73) Assignee: Progressive Components International Corporation, Wauconda, IL (US)

( * ) Notice: Subject to any disclaimer, the term of this patent is extended or adjusted under 35 U.S.C. 154(b) by 5 days.

(21) Appl. No.: 12/803,621

(22) Filed: Jun. 30, 2010

(65) Prior Publication Data

US 2011/0020490 A1  Jan. 27, 2011

Related U.S. Application Data

(60) Provisional application No. 61/283,255, filed on Nov. 30, 2009.

(51) Int. Cl.
*B29C 45/44* (2006.01)

(52) U.S. Cl. ........ 425/556; 264/318; 264/334; 425/442; 425/577; 425/DIG. 58

(58) Field of Classification Search .................. 425/556, 425/442, 577, DIG. 58; 249/63, 178, 180, 249/185; 264/318
See application file for complete search history.

(56) References Cited

U.S. PATENT DOCUMENTS

| 3,642,417 | A | * | 2/1972 | Von Holdt | 425/443 |
| 5,217,731 | A | * | 6/1993 | Fallent | 425/556 |
| 5,281,127 | A | | 1/1994 | Ramsey | |
| 5,773,048 | A | | 6/1998 | Ramsey | |

FOREIGN PATENT DOCUMENTS

| EP | 1 674 235 A1 | 6/2006 |
| EP | 2 261 000 A1 | 12/2010 |
| ES | 2 135 182 | 10/1999 |
| ES | 1 061 679 U | 3/2006 |
| ES | 1 061 680 U | 3/2006 |
| ES | 2 320 504 | 5/2009 |
| ES | 2 345 697 | 9/2010 |
| JP | 4319413 | 11/1992 |
| WO | WO 2009/083630 A1 | 7/2009 |

OTHER PUBLICATIONS

"Compact Standard Housing Lifter", spec sheet, www.pcs-company.com published prior to Jun. 30, 2010, possibly published Jan. 2007.

* cited by examiner

*Primary Examiner* — Tim Heitbrink
(74) *Attorney, Agent, or Firm* — Pauley Petersen & Erickson

(57) ABSTRACT

An apparatus for releasing a part that has an undercut, particularly in an injection molding system. A flange is moveably mounted with respect to a moveable part of an injection mold. A head is moveably mounted with respect to the moveable part. A joint, such as a ball-and-socket joint, is used to connect the head with respect to the flange. The head has a shoulder that contacts a stop which is longitudinally fixed with respect to the moveable part, when the mold is in a closed position. A bias element can be used to normally urge the head in a lateral direction with respect to the moveable part.

17 Claims, 10 Drawing Sheets

DEMOLDING DEVICE FOR AN INJECTION MOLDING PART WITH AN UNDERCUT

CROSS REFERENCE TO RELATED APPLICATION

This U.S. patent application claims the benefit, under 35 U.S.C. Section 119 and/or Section 120, of U.S. Ser. No. 61/283,255, filed on 30 Nov. 2009.

BACKGROUND OF THE INVENTION

1. Field of the Invention

This invention relates to a device for demolding a plastic injection molded part with an undercut, particularly a device that eliminates burrs and improves mold release.

2. Discussion of Related Art

Some known injection molding systems include a mold with a moveable part and a fixed part. A molded part or piece is formed between the moveable part and the fixed part, within a mold, for example when the mold system is in a closed position.

As the mold system moves from the closed position to an extended position where the moveable part is at a distance from the fixed part, the molded part can be ejected or otherwise removed by known ejector pins and/or another conventional ejection device.

The designs of conventional ejection devices become more complex when the molded part forms an undercut or another similar negative, void, space or volume. There is a need for an ejection device that can operate efficiently when demolding a molded part, particularly a part with an undercut or a negative, void or space.

Figure 5:
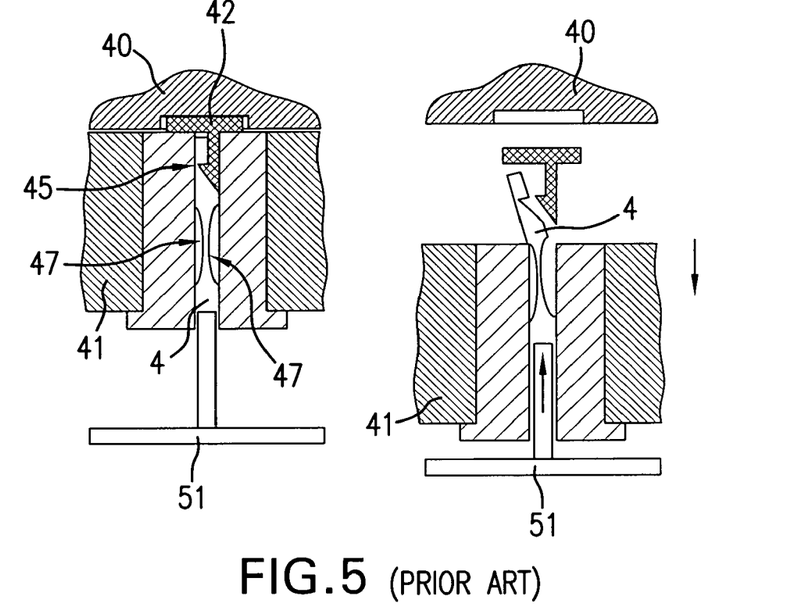
FIG. 5 shows two partial sectional views, each of a different position of a fixed part and a moveable part of a mold system, as known in the prior art.
Figure 6:
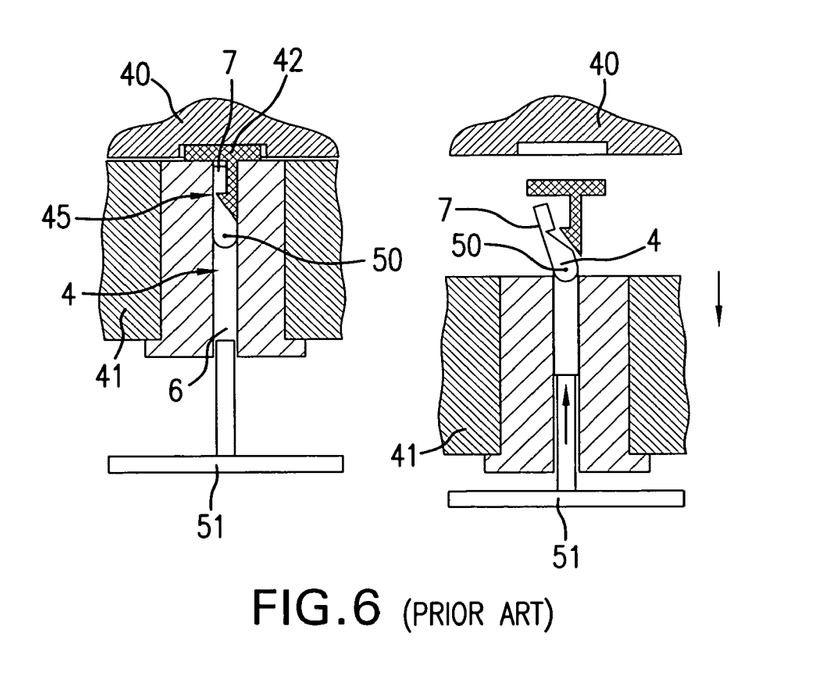
FIG. 6 shows two partial sectional views, each of a different position of a fixed part and a moveable part, according to another known prior art molding system.

FIGS. 5 and 6 show a conventional mold for molding plastic pieces including a fixed part 40 and a movable part 41. A die plate is mounted to the fixed part 40 and another die plate is fixed to the moveable part 41. These two plates form the part or piece 42 to be molded. The moveable part 41 of the mold is closed against the fixed part 40 and forms a molding chamber between the two die plates.

The moveable part 41 of the mold is later separated from the fixed part 40, and the finished or molded piece 42 remains affixed to one of them, normally to the plate corresponding to the moveable part 41 of the mold. The piece 42 is removed using an ejection device or another suitable removal apparatus.

The molded pieces 42 are usually ejected using pins or sterns which push the molded piece 42 out of the die plate. Pins or stems can emanate from an ejection plate 51 which is incorporated so that it floats about the moveable part 41 of the mold. When the ejection plate 51 moves then the pins move the molded piece 42 to be demolded.

In the plastic molding industry, the areas of the mold which do not have the same demolding direction as the remainder of the pieces are known as undercuts, negatives and/or voids. For example, a gripper 45 for the piece 42 cannot be demolded in the direction used to directly extract the piece 42, because it is buried in the piece 42.

For demolding, some movable counter-molds 4 move forward with the ejection plate 51 and also open on the sides. This opening or lateral movement releases the negative and allows the piece 42 to be ejected, extracted or removed, such as shown in FIGS. 5 and 6.

FIG. 5 shows a one embodiment of the counter-mold 4. The counter-mold 4 includes a rectangular or circular bar 47, which is laterally lowered to allow a lateral flexion and release the negative from the mold.

Another embodiment of the counter-mold 4 is shown in FIG. 6. The counter-mold 4 includes a cylindrical runner 6 and a collapsible head 7 articulated together. The articulation 50 allows the collapsible head 7 to move laterally and to release the negative.

One problem with the first prior art embodiment can occur if replacement is required due to breakage or wearing, because the entire element must be replaced which requires complete disassembly of the mold support plates as well as considerable time to machine the housing of the piece, which relates to costs.

The second prior art embodiment can have no problems but the adjustment for the two pieces forming the counter-mold is cylindrical with reduced conicity because the injection pressure for the plastic can change the position of the collapsible head 7, and thus cause a change in the geometry of the pieces, burrs, and the like. As the cylindrical part has a greater surface it needs to travel further to collapse the first piece.

Some of these problems are solved by an invention taught by Spanish Patent Application 200502882 which refers to a negative demolding system, and covers the layout of a spring between the runner and the head to improve its collapsibility, and the layout of a tilted lateral face in the collapsible head which relocates the head as it moves back into the bushing.

The invention of Spanish Patent Application 200502882 helps meet some objectives but this invention moves forward to meet other objectives with the development of an advantageous demolding system.

SUMMARY OF THE INVENTION

Each and every one of the following publications is incorporated in its entirety into this specification by reference thereto:
1. PCT International Application PCT/ES2008/070222;
2. Spain Utility Model P200703497
3. Spain Utility Model 200502577;
4. Spain Utility Model 200502578; and
5. Spain Patent Application P200502882.

A device for demolding negatives in plastic injection molding according to this invention offers various advantages over other similar known systems.

According to this invention, the demolding device is coupled to a device or apparatus for ejecting a plastic injection mold, and includes a guide bushing that can be attached to the die plate of the moveable part of the mold, inside of which is a counter-mold that molds the negative. The counter-mold of some embodiments of this invention includes a guide runner and a collapsible head to demold the negative.

Inside the guide bushing there is a projection that pushes against the side of the head as the counter-mold moves forward, forcing it to collapse laterally and thereby release the negative.

In addition, the device of some embodiments of this invention also includes a stop located at the entry of the counter-mold, inside the guide bushing.

Thus, the head is forced to collapse, which prevents the molded piece from becoming stuck, and prevents it from collapsing.

Stopping the run of the counter-mold also prevents it from penetrating too far into the guide bushing as a result of the injection pressure, and thus prevents the appearance of resulting burrs.

BRIEF DESCRIPTION OF THE DRAWINGS

The above and other features and objects of this invention are better understood from the following detailed description when taken in view of the drawings, wherein.

DETAILED DESCRIPTION OF THE INVENTION

This invention relates to an apparatus or device for releasing a molded part or piece, particularly one with an undercut, in an injection molding system. As used throughout this specification and in the claims, the terms blade, head, lifter blade, lifter core and/or lifter are intended to be interchangeable with each other and relate to an element that contacts a molded part during an ejection stroke within a mold system or molding process.

As shown in FIGS. 1-4, the device 1 of this invention is used to demold negatives in plastic injection and is coupled to a device or apparatus for ejecting a plastic injection mold. The device 1 of this invention comprises a guide bushing 2 that can be attached to a die plate of the movable part 41 of the mold, inside which extends a counter-mold 4 that molds a negative 5.

Figure 4:
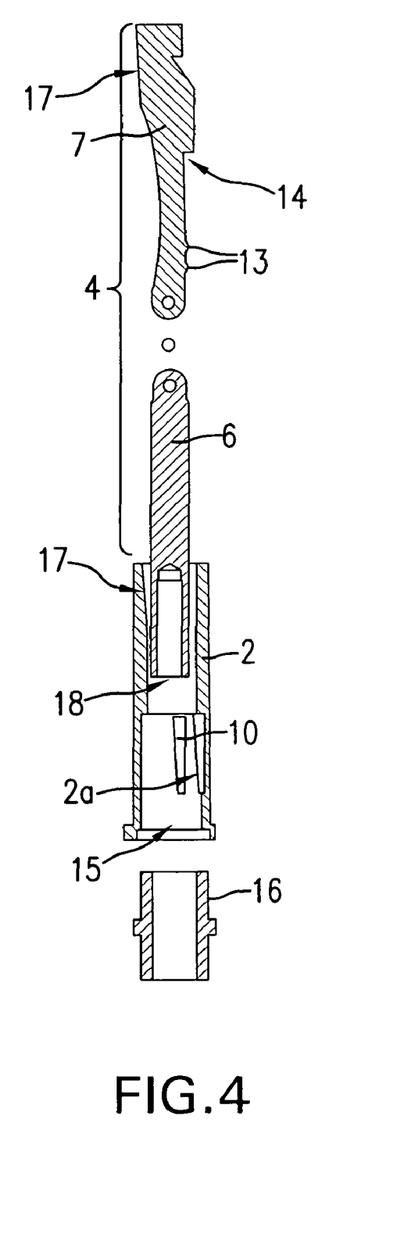
FIG. 4 shows an exploded sectional view of a release device, according to one embodiment of this invention.

The counter-mold 4 shown in FIG. 4 comprises a guide runner or flange 6 and a collapsible head 7 which is articulated to the runner 6, and used to demold the negative 5. A suitable articulation between the head 7 and the runner 6 allows the head 7 to be disassembled from a front as the counter-mold moves forward so that the pin 60, which can form the articulation, is accessible, such as shown in FIG. 2a. This feature can prevent having to dismount the complete mold support plates when the head 7 is replaced, such as from wear or for other replacement reasons.

Figure 1:
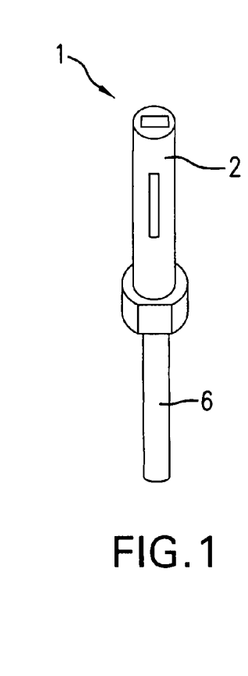
FIG. 1 is a perspective view of a general representation of a release device, not mounted in a corresponding mold part or piece, according to one embodiment of this invention.
Figure 2:
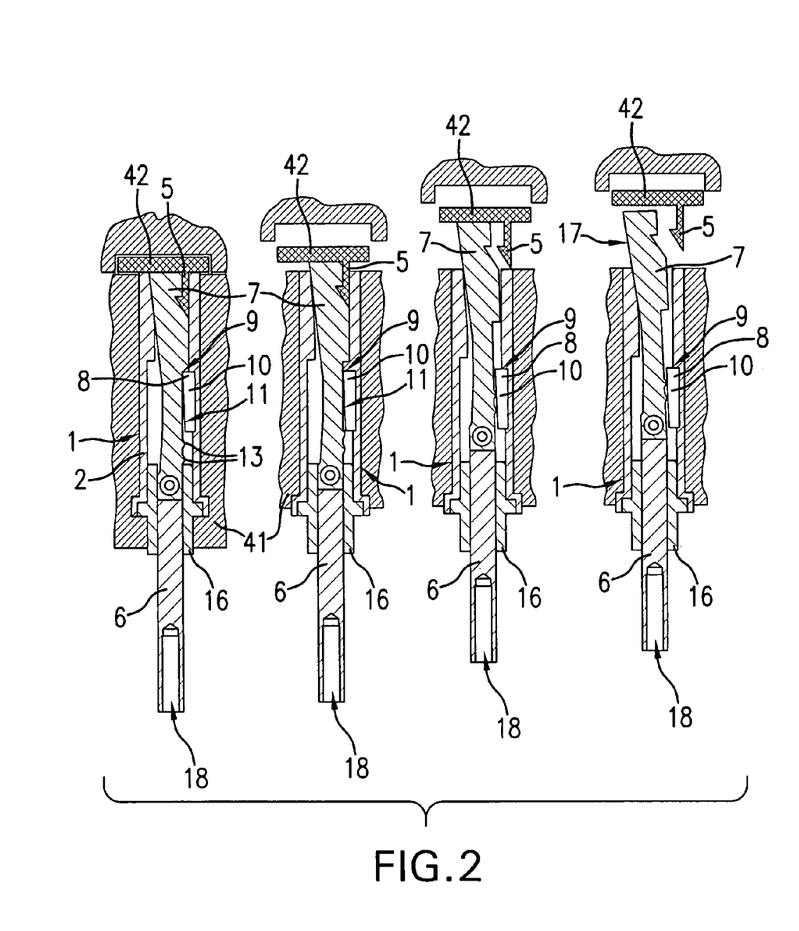
FIG. 2 shows cross-sectional views of four different sequential steps of releasing a molded part, according to one embodiment of this invention.
Figure 2A:
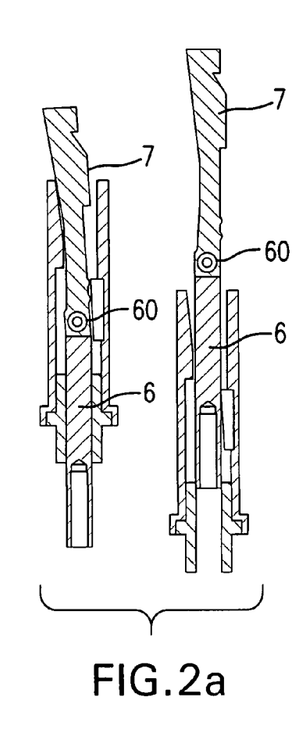
FIG. 2a shows two different cross-sectional views illustrating how to extend a blade or head into a position that allows for disassembly of the blade or head.
Figure 3:
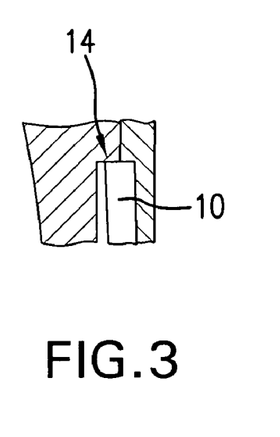
FIG. 3 shows a partial sectional view of a wedge element and a guide bushing, according to one embodiment of this invention.

Inside the guide bushing 2 is a projection 8 which pushes against the side of the head 7 as the counter-mold 4 moves forward, and thus forces the head 7 to collapse laterally and release the negative 5, according to the sequence shown in FIG. 2.

Similarly, a stop 9 positioned inside the guide bushing 2 can stop the counter-mold 4 from entering the guide bushing 2, in order to stop its run and also to eliminate burrs on the molded piece 42. In the closed position, stop 9 can also be used to prevent blow back from the injection pressure.

In the embodiment shown in FIGS. 1-4, the projection 8 and the stop 9 are formed by a single element or piece 10, which can be removed for machining, and can fit into some internal housings 2a of the guide bushing 2, such as shown in FIG. 4.

The guide bushing 2 forms a chamber 15 which is broad enough to position the piece 10 inside, in the housings 2a. This chamber is closed by an axial guide 16, through which the runner or flange 6 runs.

The piece 10 can have a tilted longitudinal runner 11 which pushes against a side of the head 7, as well as a transverse upper step 12 which forms the stop 9. The head 7 can form lateral protuberances 13 that are able to contact the step 11, as well as a chock 14 that is in contact with the stop 9.

The head 7 and the end of the guide bushing 2 where the head 7 is located can have an increased section towards a free end, for example to immobilize the counter-mold 4 as the lateral support of the head 7 in that section of the guide bushing 2 prevents the head 7 from continuing to penetrate, such as due to the plastic injection pressure. This geometry also allows the head 7 to collapse laterally with a lower ejection run, in comparison with the totally cylindrical known counter-molds 4, such as those shown in FIGS. 5 and 6. The increase in the head section 7 and the end of the guide bushing 2 can result in a flat inclined face 17 with which both contact.

In some embodiments of this invention, a hole or holes 18 at the lower ends of each runner 6 can be used to affix the runner 6 to the ejection device.

As shown in FIGS. 7, 7a-7e, 8, 9, 10 and 11, runner or flange 106 is movably mounted with respect to head 107. In some embodiments of this invention, flange 106 and head 107 have movements relative to each other that are or may be similar to the relative movements between runner or flange 6 and head 7, as described in other embodiments according to this invention, for example as shown in FIGS. 2, 2a, 3 and 4. In other embodiments of this invention, flange 106 can move with respect to head 107 in a manner different than each manner as shown in FIGS. 2, 2a, 3 and 4. Regardless of the type of movement of flange 106 with respect to head 107, head 107 may or may not have the same or similar movement as flange 6 with respect to head 7.

In the embodiments shown in FIGS. 7, 7a-7e, 8, 9, 10, 11 and 12a-12g, ball-and-socket joint 160 is used to movably connect flange 106 with respect to head 107. With ball-and-socket joint 160, it is possible for flange 106 and head 107 to follow or have the same responsive movement as flange 6 and head 7. In other embodiments according to this invention, flange 106 and head 107 can have different movements relative to each other as compared to flange 6 and head 7, depending upon the particular resultant movement of head 107 that is desired for a specific application with a possibly different resultant movement of head 107. Ball-and-socket joint 160 and/or another similar connector of this invention can be used to reduce or minimize the size of head 7 and/or head 107, as compared to conventional connectors, which can provide better space efficiency in the mold, such as when designing a mold.

As shown in FIGS. 7, 7a-7e, 8, 9, 10, 11 and 12a-12g, ball-and-socket joint 160 comprises spherical or non-spherical ball 161 connected to or integrated with head 107. In other embodiments of this invention, the spherical or non-spherical ball 161 can have any other suitable shape and/or can be connected to or integrated with flange 106 in any other suitable manner, for example for a reversal of element roles. Similarly, as shown in FIGS. 7, 7a-7e, 8, 9, 10, 11 and 12a-12g, ball-and-socket joint 160 comprises receiver 162 or another suitable opening connected to or integrated with flange 106. In other embodiments of this invention, receiver 162 or another suitable opening can be connected to or integrated with head 107, for example for a reversal of roles. In still other embodiments according to this invention, flange 106 can have any other suitable connector or connection, including but not limited to a mechanical connection, an electromechanical connection, an electrical connection and/or a magnetic connection, that can be used to accomplish the desired resultant movement of head 107 with respect to flange 106.

Figure 8:
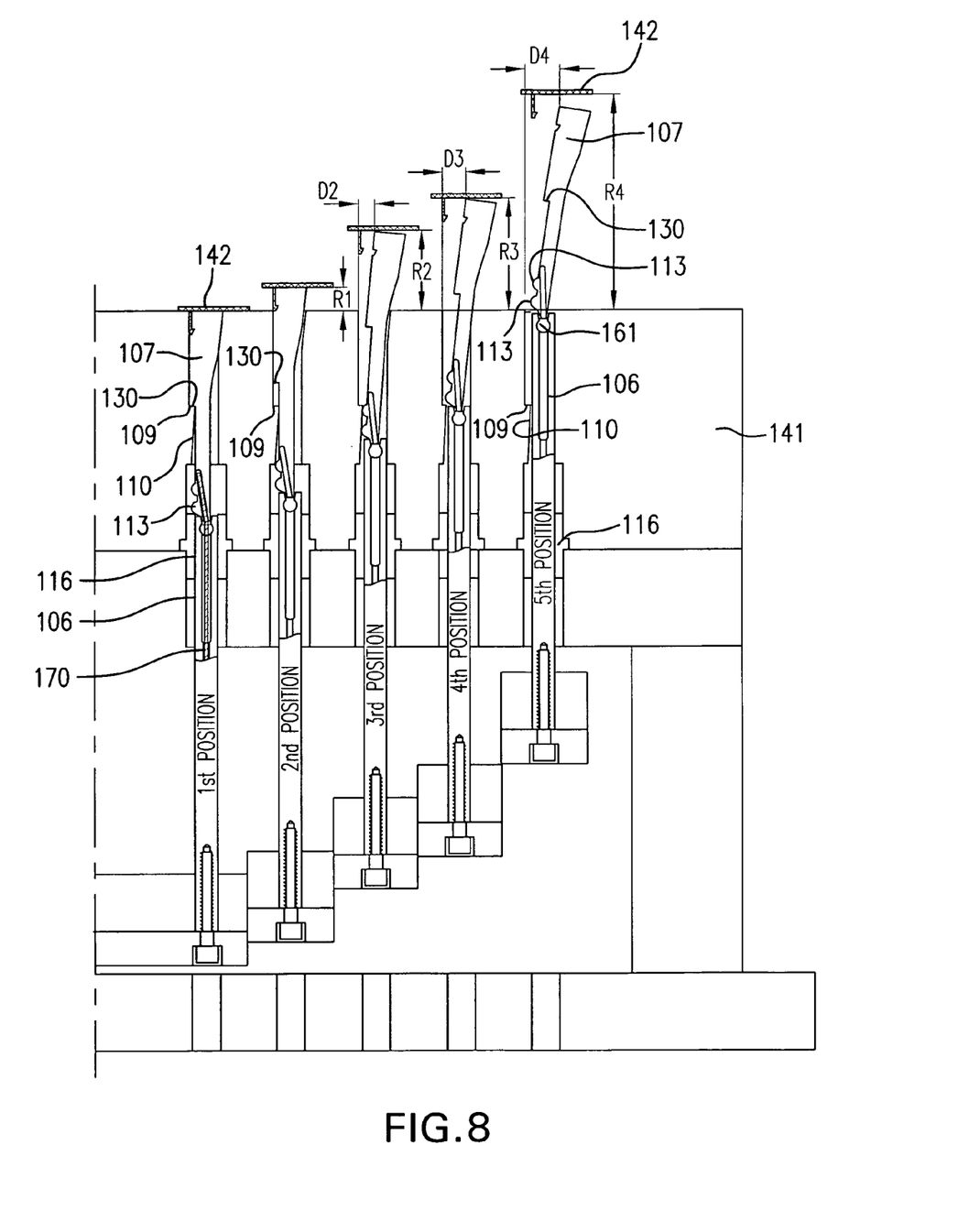
FIG. 8 shows partial sectional views of five sequential and different positions, which represent a release operation or method, according to one embodiment of this invention.
Figure 9:
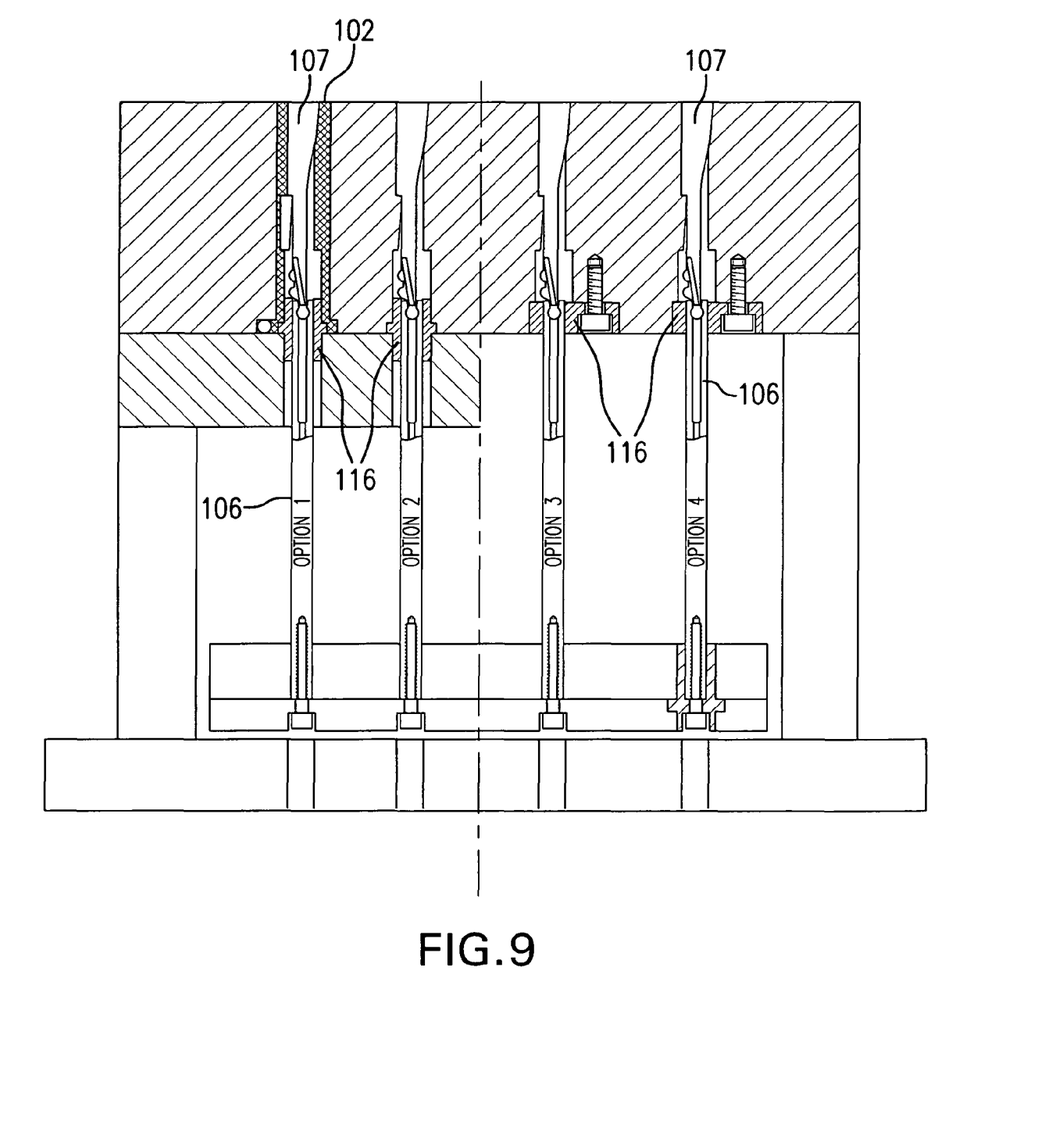
FIG. 9 shows a partial cross-sectional view of four different mounting options, the two on the left side being with a support plate and the two on the right side being without a support plate, according to different embodiments of this invention.
Figure 10:
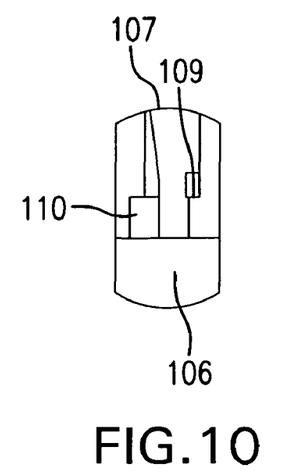
FIG. 10 is a diagrammatic partial view of a stop element, according to one embodiment of this invention.
Figure 11:
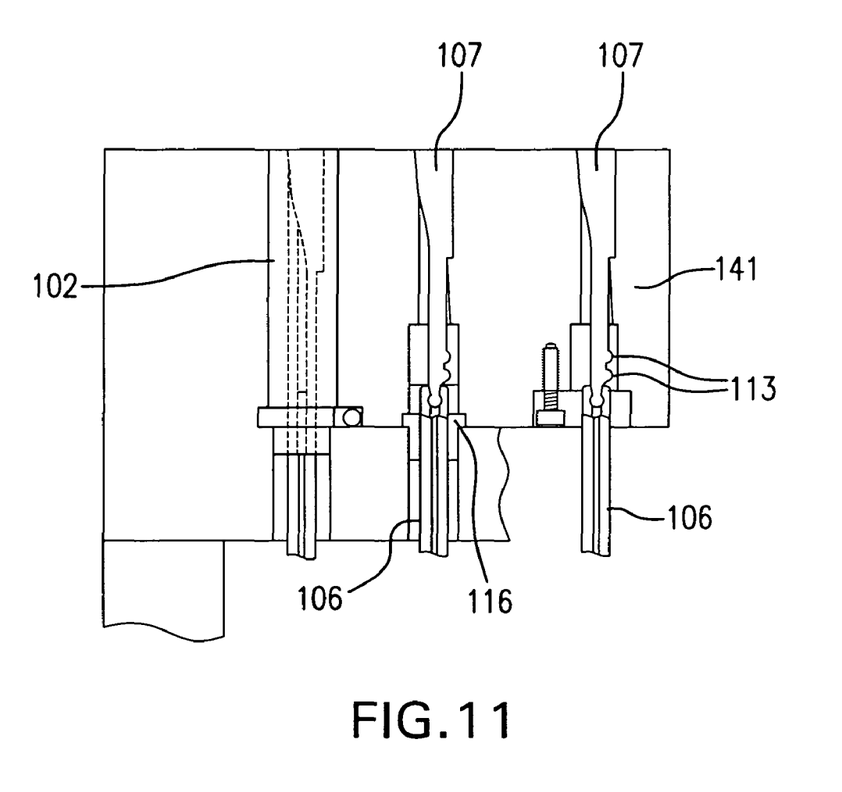
FIG. 11 is a diagrammatic view showing three different mounting arrangements, according to different embodiments of this invention.

In certain embodiments according to this invention, a spring or other bias element 170 can be used to force or urge head 107 in a specified or chosen direction, for example with respect to flange 106. FIG. 8 shows five different sequential positions of an operation cycle of the release device of this invention, wherein head 107 ultimately moves or is displaced from left to right by the offset distance D4. Bias element 170 can be sized, shaped and/or designed to accommodate or accomplish a movement of head 107 with respect to flange 106. In some embodiments of this invention, bias element 170 comprises a flat material or a leaf spring material which has a bias force normally urged in a particular or desired direction or directions. In different embodiments of this invention, bias element 170 can have any other suitable construction and/or can be made of any suitable material that will accomplish the desired result of a bias force normally acting in a particular or desired direction.

Figure 12A:
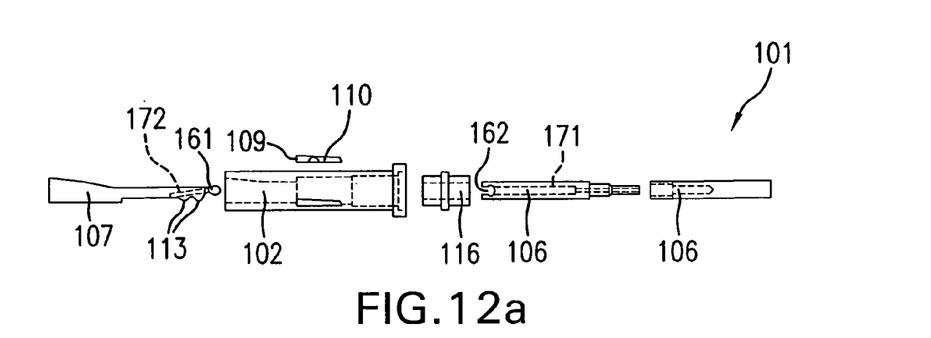
FIGS. 12a-12g each shows an exploded view of a release device, according to different embodiments of this invention.
Figure 12B:
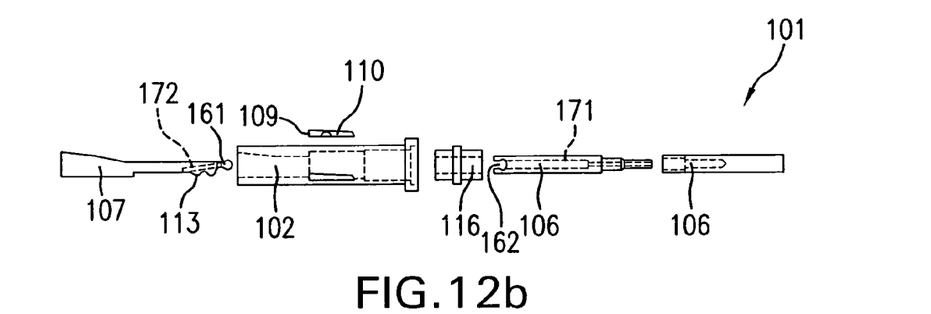
Figure 12C:
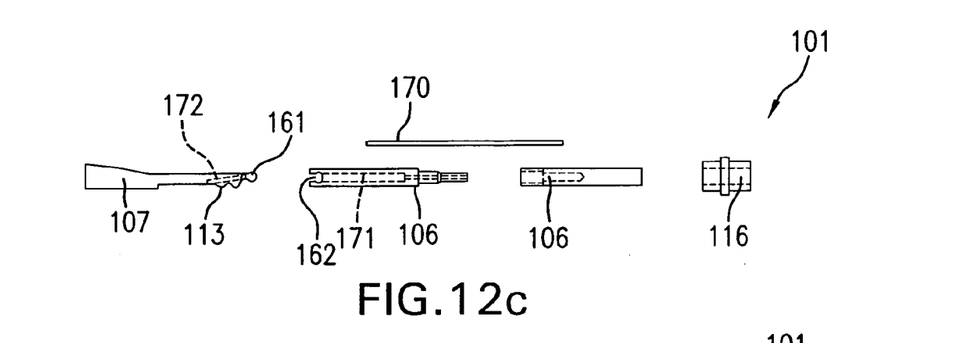
Figure 12D:
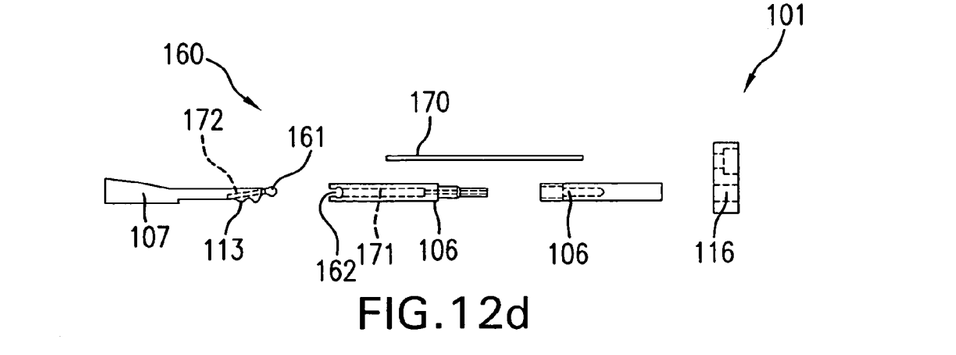
Figure 12E:
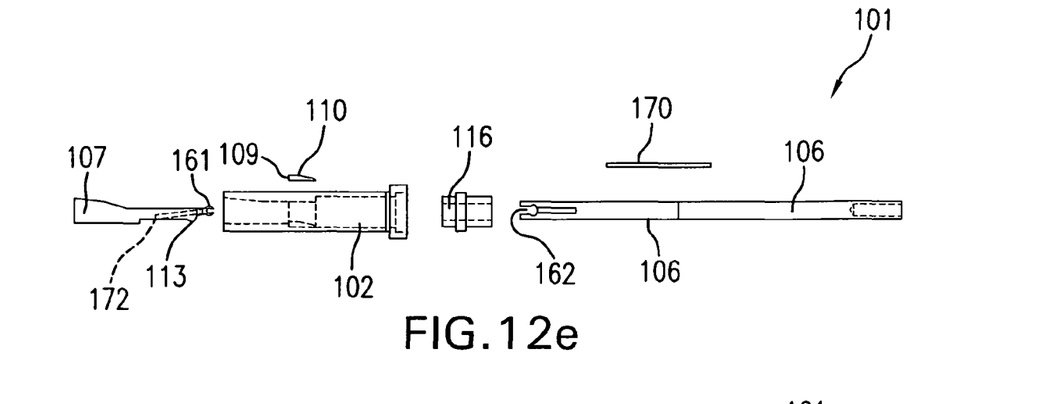
Figure 12F:
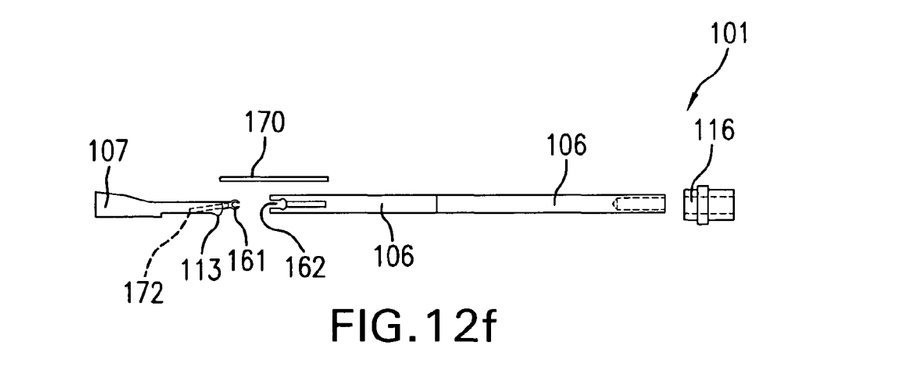
Figure 12G:
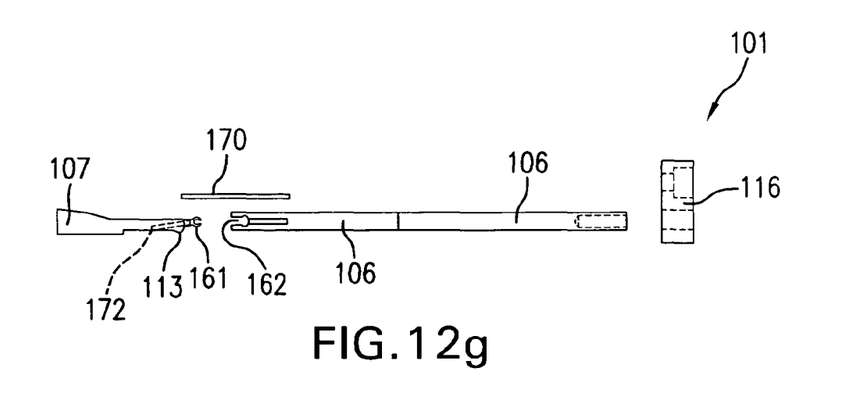
Figure 13:
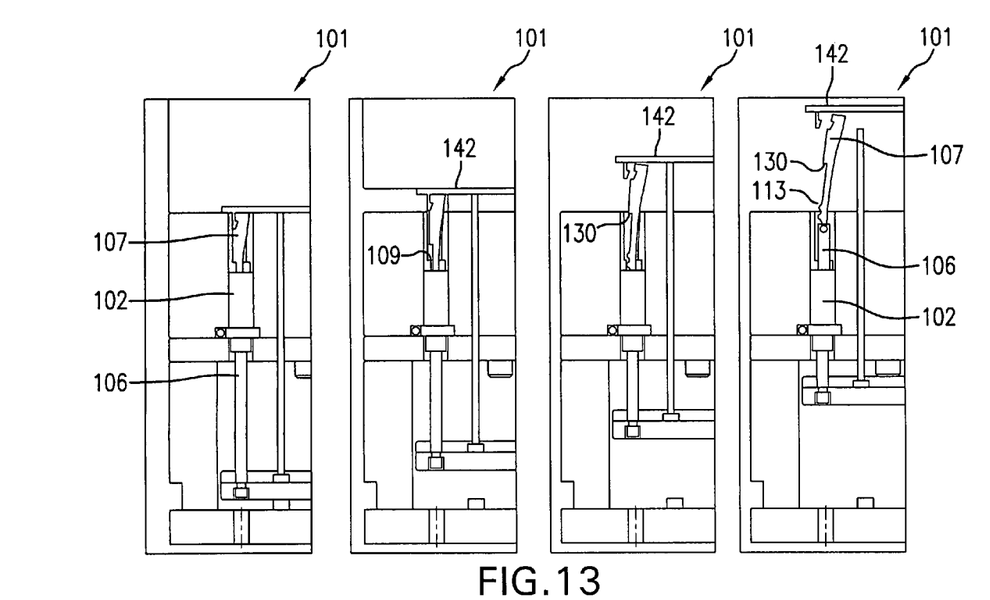
FIG. 13 shows diagrammatic views of four different sequential steps of operating a release device, according to another embodiment of this invention.
Figure 14:
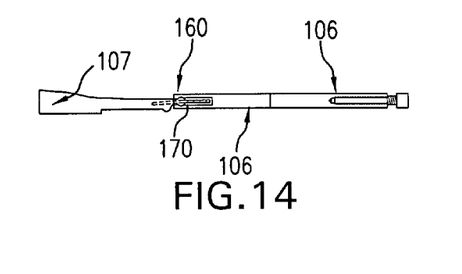
FIG. 14 shows a partial sectional view of a release device, according to one embodiment of this invention.
Figures 15, 16:
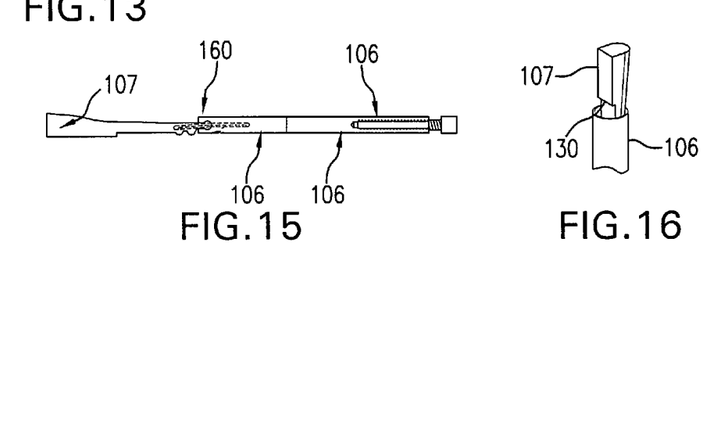
FIG. 15 shows a partial sectional view of a release device, according to another embodiment of this invention.
FIG. 16 shows a perspective view of a blade or head, according to one embodiment of this invention.

FIG. 12c, for example, shows an exploded view of one embodiment of bias element 170 according to this invention. In the embodiment shown in FIG. 12c, flange 106 forms passage 171 and head 107 forms passage 172, and in a mounted position, bias element 170 is mounted or positioned within passage 171 and/or passage 172. In other embodiments according to this invention, bias element 170 can have another suitable shape and/or type and still accomplish a desired result of urging or moving head 107 in a desired manner, such as in response to movement of flange 106.

In some embodiments of this invention, bias element 170 is used to normally urge head 107 in one or more desired directions, such as in a lateral direction with respect to moveable part 141 and/or another suitable structure or element. In some embodiments of this invention, such as shown in FIGS. 7c and 12c, bias element 170 is mounted within passage 171 of flange 106 and also within passage 172 of head 107. Bias element 170 can be a spring, such as a spring made of flat material, or can have any other suitable size, shape and/or design.

Referring to FIG. 8, during a cycle of demolding the relative positions of flange 106 and head 107, particularly with respect to moveable part 141, are shown sequentially, start-to-finish from left-to-right. The first position, the left-most position shown in FIG. 8, is a closed position of the injection mold, for example where part 142 is molded. As shown in the fifth position, the right-most position, head 107 moves in a lateral direction, from left-to-right from the first position as shown in FIG. 8, a distance or offset D4. In some embodiments according to this invention, after reaching the fifth position where there is a maximum stroke R4 and maximum offset D4, device 101 reverses the sequence and moves head 107 back to the initial closed first position to complete one mold ejection cycle. The release device according to this invention is intended to operate through many cycles and thus produce many molded parts 142.

As shown in FIG. 8, flange 106 is moveably mounted with respect to moveable part 141 of the injection mold. Any suitable element, rod, pin, arm or other suitable structure or mover can be used to move flange 106 with respect to moveable part 141. In some embodiments of this invention, head 107 is moveably mounted with respect to moveable part 141. When head 107 is connected with respect to flange 106, flange 106 can act as the mover or moving device for moving head 107 with respect to moveable part 141.

Figure 7:
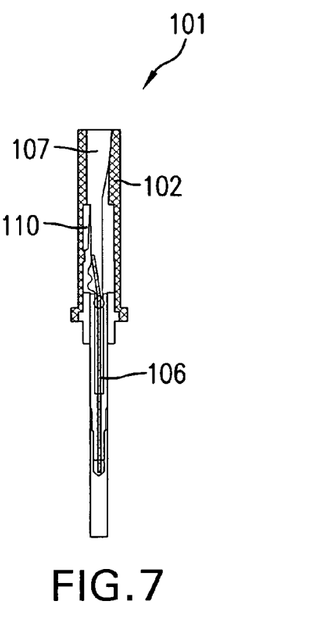
FIG. 7 shows a partial cross-sectional view of a release device, according to one embodiment of this invention.
Figure 7A:
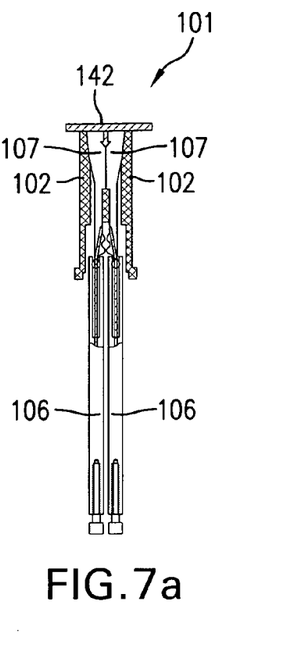
FIG. 7a shows a partial cross-sectional view of a release device, according to another embodiment of this invention.
Figure 7B:
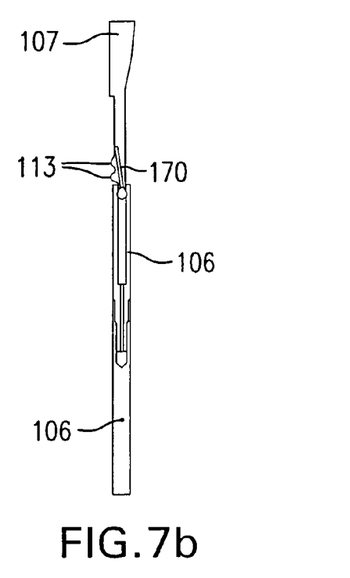
FIG. 7b shows a partial sectional view of a release device, according to one embodiment of this invention.
Figure 7C:
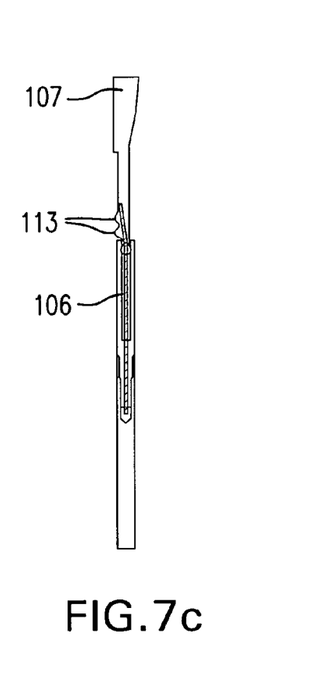
FIG. 7c shows a partial sectional view of the release device shown in FIG. 7b, but further showing an internally mounted bias element.
Figure 7D:
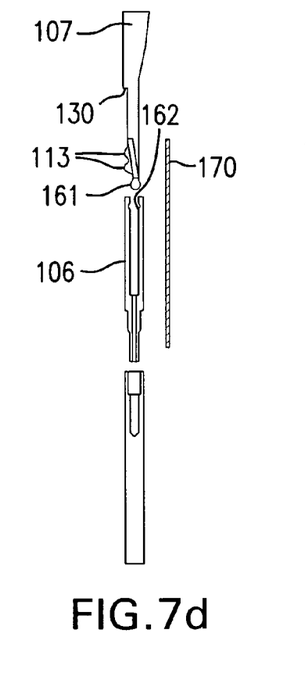
FIG. 7d shows an exploded partial sectional view of the release device as shown in FIG. 7c.
Figure 7E:
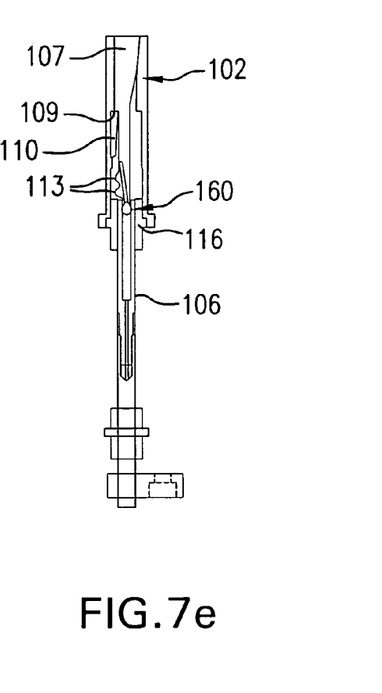
FIG. 7e shows a partial sectional view of a release device mounted within a guide bushing, according to one embodiment of this invention.

As shown in FIGS. 7e, 8 and 12c, for example, ball-and-socket joint 160 connects head 107 with respect to flange 106. Ball-and-socket joint 160 comprises ball 161 and receiver 162, according to certain embodiments of this invention. In other embodiments of this invention, any other mechanical joint that results in movement similar to the movement of ball-and-socket joint 160 can be used in lieu of and/or together with ball-and-socket joint 160.

As shown in FIG. 8, in the first position, head 107 has shoulder 130 that contacts stop 109 of wedge element 110. In some embodiments of this invention, the contact between stop 109 and shoulder 130 limits movement, such as longitudinal movement, of flange 106 with respect to moveable part 141. Any other suitable stop mechanism can be used to accomplish the same or a similar limiting movement. In some embodiments of this invention, stop 109 limits longitudinal or axial movement of head 107, for example with respect to moveable part 141.

In certain embodiments according to this invention, such as shown in FIGS. 2 and 8, stop 109 is formed by wedge element 110 which can be fixed with respect to moveable part 141 or can be integrated with moveable part 141, such as shown in FIG. 8.

In the third position of device 101 as shown in FIG. 8, two protuberances 113 contact wedge element 110 to move head 107 in a lateral direction with respect to moveable part 141. In some embodiments according to this invention, there can be one or more than two protuberances 113. Each protuberance 113 can form a cam surface or cam element that rides or follows along wedge element 110, such as during at least a portion of a movement of head 107 between the closed position and a maximum stroke position of the injection mold.

Any suitable cam surface and/or any suitable following surface, such as wedge element 110, can be used to accomplish a similar result of head 107 moving in response to movement of flange 106 and/or another similar element.

In some embodiments according to this invention, such as shown in FIGS. 7, 7e and 12a, guide bushing 102 is mounted with respect to moveable part 141, and can be mounted in any suitable manner known to those skilled in the art. In some embodiments of this invention, wedge element 110 is fixed with respect to or integrated with guide bushing 102. In other embodiments according to this invention, such as shown in FIG. 8, the release device according to this invention operates or functions without guide bushing 102.

Many of the elements described with respect to embodiments of this invention as shown in FIGS. 1, 2, 2a and 3-6 and described in this specification can be used in combination with or in place of elements of other embodiments of this invention, including those with similar element reference numerals, such as those described in view of FIGS. 7, 7a-7e, 8-11, 12a-12g and 13-16, without departing from the results desired of this invention. Likewise, many of the elements described with respect to embodiments of this invention as shown in FIGS. 7, 7a-7e, 8-11, 12a-12g and 13-16 and described in this specification can be used in combination with or in place of elements of other embodiments of this invention, including those with similar element reference numerals, such as those described in view of FIGS. 1, 2, 2a and 3-6, without departing from the results desired of this invention.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention

What is claimed is:

1. An apparatus for releasing a part with an undercut in injection molding, the apparatus comprising:
    a flange movably mounted with respect to a movable part of an injection mold, a head movably mounted with respect to the movable part, a spherical ball connected to or integrated with the head, a receiver connected to or integrated with the flange, and the ball and the receiver forming a ball-and-socket joint connecting the head with respect to the flange.

2. The apparatus according to claim 1, wherein the head has a shoulder that in a closed position of the injection mold contacts a stop longitudinally fixed with respect to the moveable part.

3. The apparatus according to claim 2, wherein the stop limits longitudinal movement of the head in a closing direction.

4. The apparatus according to claim 2, wherein the stop is formed by a wedge element fixed with respect to the movable part or integrated with the moveable part.

5. The apparatus according to claim 1, wherein at least one protuberance is connected to or integrated with the head, and each said protuberance contacts a wedge element to move the head in a lateral direction with respect to the movable part.

6. The apparatus according to claim 5, wherein each said protuberance forms a cam that rides along the wedge element during at least a portion of a movement of the head between a closed position and a maximum stroke position of the injection mold.

7. The apparatus according to claim 1, further comprising a bias element mounted within a first passage of the head and a second passage of the flange, and the bias element normally urging the head in a lateral direction with respect to the movable part.

8. The apparatus according to claim 1, further comprising a guide bushing mounted with respect to the movable part, and a wedge element fixed with respect to or integrated with the guide bushing.

9. An apparatus for releasing a part with a negative in injection molding, the apparatus comprising:
    a flange movably mounted with respect to a movable part of an injection mold, a head movably mounted with respect to the movable part, the head having a shoulder that in a closed position of the injection mold contacts a stop longitudinally fixed with respect to the movable part, and a bias element normally urging the head in a lateral direction with respect to the movable said bias element positioned within a first passage of the head and a second passage of the flange.

10. The apparatus according to claim 9, further comprising a ball-and-socket joint connecting the head with respect to the flange.

11. The apparatus according to claim 9, wherein the stop limits longitudinal movement of the head in a closing direction.

12. The apparatus according to claim 9, wherein the stop is formed by a wedge element fixed with respect to the movable part or integrated with the moveable part.

13. The apparatus according to claim 9, wherein at least one protuberance is connected to or integrated with the head, and each said protuberance contacts a wedge element to move the head in a lateral direction with respect to the movable part.

14. The apparatus according to claim 13, wherein each said protuberance forms a cam that rides along the wedge element during at least a portion of a movement of the head between a closed position and a maximum stroke position of the injection mold.

15. The apparatus according to claim 9, wherein the bias element is mounted within a first passage of the head and a second passage of the flange.

16. The apparatus according to claim 9, further comprising a guide bushing mounted with respect to the movable part, and a wedge element fixed with respect to or integrated with the guide bushing.

17. An apparatus for releasing a part with a negative in injection molding, the apparatus comprising:
    a flange movably mounted with respect to a movable part of an injection mold, a head movably mounted with respect to the movable part, a ball-and-socket joint connecting the head with respect to the flange, said ball-and-socket joint formed by a spherical ball connected to the head mounted within a receiver connected to the flange, head having a shoulder that in a closed position of the injection mold contacts a stop longitudinally fixed with respect to the movable part, and a bias element normally urging the head in a lateral direction with respect to the movable part.

* * * * *